(12) United States Patent
Chiffey et al.

(10) Patent No.: US 10,975,745 B2
(45) Date of Patent: Apr. 13, 2021

(54) PASSIVE $NO_x$ ADSORBER

(71) Applicant: JOHNSON MATTHEY PUBLIC LIMITED COMPANY, London (GB)

(72) Inventors: Andrew Francis Chiffey, Royston (GB); Jack Corps, Royston (GB); Laura Mitchell-Downie, Royston (GB); Francois Moreau, Royston (GB); Matthew O'Brien, Royston (GB)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 16/517,886

(22) Filed: Jul. 22, 2019

(65) Prior Publication Data
US 2019/0345859 A1 Nov. 14, 2019

Related U.S. Application Data

(63) Continuation of application No. 15/285,546, filed on Oct. 5, 2016, now abandoned.

(30) Foreign Application Priority Data

Oct. 6, 2015 (GB) ..................................... 1517578

(51) Int. Cl.
*F01N 3/022* (2006.01)
*F01N 3/08* (2006.01)
(Continued)

(52) U.S. Cl.
CPC ......... *F01N 3/0842* (2013.01); *B01D 53/944* (2013.01); *B01D 53/9422* (2013.01);
(Continued)

(58) Field of Classification Search
CPC .. B01D 53/18; B01D 53/9422; B01D 53/944; B01D 53/9463; B01D 53/9468;
(Continued)

(56) References Cited

U.S. PATENT DOCUMENTS

| | | |
|---|---|---|
| 4,300,956 A | 11/1981 | Rosenberger et al. |
| 5,146,743 A | 9/1992 | Maus et al. |

(Continued)

FOREIGN PATENT DOCUMENTS

| | | |
|---|---|---|
| EP | 0992276 A1 | 4/2000 |
| EP | 1482139 A1 | 12/2004 |

(Continued)

*Primary Examiner* — Audrey K Bradley

(57) ABSTRACT

A $NO_x$ absorber catalyst for treating an exhaust gas from a diesel engine. The $NO_x$ absorber catalyst comprises a first $NO_x$ absorber material comprising a molecular sieve catalyst, wherein the molecular sieve catalyst comprises a noble metal and a molecular sieve, and wherein the molecular sieve contains the noble metal; a second $NO_x$ absorber material comprising palladium (Pd) supported on an oxide of cerium; and a substrate having an inlet end and an outlet end.

7 Claims, 2 Drawing Sheets

(51) Int. Cl.
*F01N 13/00* (2010.01)
*B01D 53/94* (2006.01)
*B01J 23/656* (2006.01)
*B01J 29/74* (2006.01)
*B01J 29/78* (2006.01)
*B01J 35/04* (2006.01)
*B01J 37/02* (2006.01)
*B01D 53/18* (2006.01)

(52) U.S. Cl.
CPC ..... *B01D 53/9463* (2013.01); *B01D 53/9468* (2013.01); *B01D 53/9472* (2013.01); *B01D 53/9481* (2013.01); *B01J 23/6562* (2013.01); *B01J 29/743* (2013.01); *B01J 29/7415* (2013.01); *B01J 29/783* (2013.01); *B01J 35/04* (2013.01); *B01J 37/0244* (2013.01); *B01J 37/0246* (2013.01); *B01J 37/0248* (2013.01); *F01N 3/0222* (2013.01); *F01N 3/0814* (2013.01); *F01N 3/0821* (2013.01); *F01N 13/009* (2014.06); *F01N 13/0093* (2014.06); *B01D 53/18* (2013.01); *B01D 2255/10* (2013.01); *B01D 2255/1021* (2013.01); *B01D 2255/1023* (2013.01); *B01D 2255/2065* (2013.01); *B01D 2255/50* (2013.01); *B01D 2255/502* (2013.01); *B01D 2255/504* (2013.01); *B01D 2255/908* (2013.01); *B01D 2255/9032* (2013.01); *B01D 2255/91* (2013.01); *B01D 2258/012* (2013.01); *B01J 2229/186* (2013.01); *B01J 2229/42* (2013.01); *F01N 2370/04* (2013.01); *F01N 2510/063* (2013.01); *F01N 2570/14* (2013.01); *F01N 2570/16* (2013.01)

(58) Field of Classification Search
CPC ............ B01D 53/9472; B01D 53/9481; B01D 2255/10; B01D 2255/2021; B01D 2255/1023; B01D 2255/2061; B01D 2255/2063; B01D 2255/2065; B01D 2255/2066; B01D 2255/20707; B01D 2255/20776; B01D 2255/30; B01D 2255/407; B01D 2255/50; B01D 2255/502; B01D 2255/504; B01D 2255/9022; B01D 2255/9032; B01D 2255/908; B01D 2255/91; B01D 2258/012; B01J 23/6562; B01J 29/743; B01J 29/283; B01J 29/7415; B01J 35/04; B01J 37/0244; B01J 37/0246; B01J 37/0248; B01J 2229/186; B01J 2229/42; F01N 3/0222; F01N 3/0814; F01N 3/0821; F01N 3/0842; F01N 13/009; F01N 13/0093; F01N 2510/063; F01N 2370/04; F01N 2570/14; F01N 2570/16

See application file for complete search history.

(56) References Cited

U.S. PATENT DOCUMENTS

| | | | | |
|---|---|---|---|---|
| 5,744,103 | A | * | 4/1998 | Yamada ............ B01D 53/9481 422/171 |
| 6,513,324 | B2 | | 2/2003 | Bruck et al. |
| 9,636,634 | B2 | | 5/2017 | Chiffey et al. |
| 2005/0020443 | A1 | | 1/2005 | Wei et al. |
| 2008/0260610 | A1 | | 10/2008 | Theis et al. |
| 2010/0287918 | A1 | | 11/2010 | Kuwajima |
| 2011/0206584 | A1 | | 8/2011 | Dobson et al. |
| 2013/0216441 | A1 | * | 8/2013 | Johansen ............ B01J 37/0246 422/171 |
| 2015/0176455 | A1 | | 6/2015 | Chandler et al. |
| 2015/0202572 | A1 | | 7/2015 | Chiffey et al. |
| 2015/0202611 | A1 | | 7/2015 | Chiffey et al. |
| 2015/0252708 | A1 | | 9/2015 | Brown et al. |
| 2015/0273452 | A1 | | 10/2015 | Chiffey et al. |
| 2016/0067690 | A1 | | 3/2016 | Sato et al. |
| 2017/0282124 | A1 | * | 10/2017 | Bischof ............... B01J 37/0203 |

FOREIGN PATENT DOCUMENTS

| | | | | |
|---|---|---|---|---|
| GB | 2355944 | A | | 5/2001 |
| GB | 2522557 | A | | 7/2015 |
| JP | 06142520 | A | * | 5/1994 |
| JP | 2013146693 | A | * | 8/2013 |
| RU | 2524165 | C2 | | 3/2013 |
| WO | 9947260 | A1 | | 9/1999 |
| WO | 2007077462 | A1 | | 7/2007 |
| WO | 2011080525 | | | 7/2011 |
| WO | 2012166868 | A1 | | 12/2012 |
| WO | 2014184568 | A1 | | 11/2014 |
| WO | 2015095056 | A1 | | 6/2015 |

* cited by examiner

PASSIVE NO$_x$ ADSORBER

CROSS-REFERENCE TO RELATED APPLICATIONS

This application is a Continuation of U.S. patent application Ser. No. 15/285,546, filed Oct. 5, 2016, which claims priority benefit of GB Patent Application No. 1517578.9, filed Oct. 6, 2015, the disclosure of which is incorporated herein by reference in its entireties for all purposes.

FIELD OF THE INVENTION

The invention relates to a NO$_x$ absorber catalyst for a lean burn engine and to an exhaust system for a lean burn engine comprising the NO$_x$ absorber catalyst. The invention also relates to a method of using the NO$_x$ absorber catalyst to treat an exhaust gas from a lean burn engine.

BACKGROUND TO THE INVENTION

Lean burn engines, such as diesel engines, produce an exhaust emission that generally contains at least four classes of pollutant that are legislated against by inter-governmental organisations throughout the world: carbon monoxide (CO), unburned hydrocarbons (HCs), oxides of nitrogen (NO$_x$) and particulate matter (PM).

A variety of emissions control devices exist for the treatment of oxides of nitrogen (NO$_x$). These devices include, for example, a selective catalytic reduction (SCR) catalyst, a selective catalytic reduction filter (SCRF™) catalyst, a lean NO$_x$ catalyst [e.g. hydrocarbon (HC) SCR catalyst], a lean NO$_x$ trap (LNT) [also known as a NO$_x$ storage catalyst (NSC) or a NO$_x$ adsorber catalyst (NAC)] and a passive NO$_x$ adsorber (PNA).

SCR catalysts or SCRF™ catalysts typically achieve high efficiencies for treating NO$_x$ by reduction once they have reached their effective operating temperature. However, these catalysts or devices can be relatively inefficient below their effective operating temperature, such as when the engine has been started from cold (the "cold start" period) or has been idling for a prolonged period.

Another common type of emissions control device for reducing or preventing the emission of NO$_x$ is a lean NO$_x$ trap (LNT). During normal operation, a lean burn engine produces an exhaust emission having a "lean" composition. An LNT is able to store or trap the nitrogen oxides (NO$_x$) that are present in the "lean" exhaust emission. The LNT stores or traps the NO$_x$ present in the exhaust emission by a chemical reaction between the NO$_x$ and a NO$_x$ storage component of the LNT to form an inorganic nitrate. The amount of NO$_x$ that can be stored by the LNT is limited by the amount of NO$_x$ storage component that is present. Eventually, it will be necessary to release the stored NO$_x$ from the NO$_x$ storage component of the LNT, ideally when a downstream SCR or SCRF™ catalyst has reached its effective operating temperature. Release of stored NO$_x$ from an LNT is typically achieved by running the lean burn engine under rich conditions to produce an exhaust emission having a "rich" composition. Under these conditions, the inorganic nitrates of the NO$_x$ storage component decompose to reform NO$_x$. This requirement to purge an LNT under rich conditions is a disadvantage of this type of emissions control device because it affects the fuel economy of the vehicle and it increases the amount of carbon dioxide (CO$_2$) by combustion of additional fuel. LNTs also tend to show poor NO$_x$ storage efficiency at low temperatures.

A relatively new type of emissions control device for NO$_x$ is a passive NO$_x$ adsorber (PNA). PNAs are able to store or adsorb NO$_x$ at relatively low exhaust gas temperatures (e.g. less than 200° C.), usually by adsorption, and release NO$_x$ at higher temperatures. The NO$_x$ storage and release mechanism of PNAs is thermally controlled, unlike that of LNTs which require a rich purge to release stored NO$_x$.

SUMMARY OF THE INVENTION

The invention relates to a passive NO$_x$ adsorber (PNA) comprising two different materials, wherein each material has PNA activity.

The invention provides a NO$_x$ absorber catalyst for treating an exhaust gas from a lean burn engine, such as a diesel engine. The NO$_x$ absorber catalyst comprises a first NO$_x$ absorber material, a second NO$_x$ absorber material and a substrate having an inlet end and an outlet end. The first NO$_x$ absorber material comprises a molecular sieve catalyst, which comprises a noble metal and a molecular sieve, wherein the molecular sieve contains the noble metal. The second NO$_x$ absorber material comprises palladium (Pd) supported on an oxide of cerium.

The first NO$_x$ absorber material is able to store NO$_x$ at a low temperature, typically at a temperature that is much lower than the NO$_x$ storage temperature of other types of PNA or a LNT. Such low temperature NO$_x$ storage is advantageous when a lean burn engine has been started from cold (the "cold start" period) or has been idling for a prolonged period.

However, the first NO$_x$ absorber material may release stored NO$_x$ at a temperature which is lower than the effective operating temperature of a downstream SCR or SCRF™ catalyst. By combining the first NO$_x$ absorber material with a second NO$_x$ absorber material having a higher NO$_x$ release temperature, the upper limit of the temperature window for the storage of NO$_x$ can be broadened. NO$_x$ release may then occur when a downstream SCR or SCRF™ catalyst has reached its effective operating temperature. Additionally or alternatively, the NO$_x$ release temperature may overlap with a NO$_x$ storage temperature of a LNT.

The invention further provides an exhaust system for a lean burn engine, such as a diesel engine. The exhaust system comprises a NO$_x$ absorber catalyst of the invention and an emissions control device.

A further aspect of the invention relates to a vehicle. The vehicle comprises a lean burn engine and either the NO$_x$ absorber catalyst or the exhaust system of the invention.

The invention also relates to a method of treating an exhaust gas from a lean burn engine. The method comprises either contacting the exhaust gas with a NO$_x$ absorber catalyst of the invention or passing the exhaust gas through an exhaust system of the invention.

BRIEF DESCRIPTION OF THE DRAWINGS

FIG. 1 shows a NO$_x$ absorber catalyst having the first NO$_x$ absorber material (1) and the second NO$_x$ absorber material (2) in a single region, which is disposed on a substrate (3).

FIG. 2 shows a NO$_x$ absorber catalyst having a first zone comprising the first NO$_x$ absorber material (1) and a second zone comprising the second NO$_x$ absorber material (2).

FIG. 3 shows a NO$_x$ absorber catalyst having a first region comprising the first NO$_x$ absorber material (1) and a second region/zone comprising the second NO$_x$ absorber material (2). There is an overlap between the first region and the second region/zone. A part of the first region is disposed on the second region/zone. Both the first region and the second region/zone are disposed on the substrate (3).

FIG. 4 shows a $NO_x$ absorber catalyst having a first region/zone comprising the first $NO_x$ absorber material (1) and a second region comprising the second $NO_x$ absorber material (2). There is an overlap between the first region/zone and the second region. A part of the second region is disposed on the first region/zone. Both the first region/zone and the second region are disposed on the substrate (3).

FIG. 5 shows a $NO_x$ absorber catalyst having a first layer comprising the first $NO_x$ absorber material (1) disposed on a second layer comprising the second $NO_x$ absorber material (2). The second layer is disposed on the substrate (3).

DETAILED DESCRIPTION OF THE INVENTION

Figure 1:
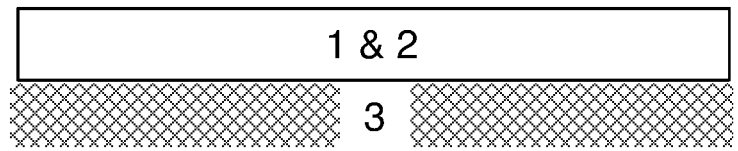
FIGS. 1 to 5 are schematic representations of NO$_x$ absorber catalysts of the invention.

The $NO_x$ absorber catalyst of the invention is for use as a passive $NO_x$ absorber (PNA). The $NO_x$ absorber catalyst comprises, or may consist essentially of, a first $NO_x$ absorber material; a second $NO_x$ absorber material; and a substrate having an inlet end and an outlet end.

In general, the first $NO_x$ absorber material is a passive $NO_x$ absorber (PNA) catalyst (i.e. it has PNA activity).

The first $NO_x$ absorber material comprises, or consists essentially of, a molecular sieve catalyst. The molecular sieve catalyst comprises, or consists of, a noble metal and a molecular sieve. The molecular sieve contains the noble metal. The molecular sieve catalyst can be prepared according to the method described in WO 2012/166868.

The noble metal is typically selected from the group consisting of palladium (Pd), platinum (Pt), rhodium (Rh), gold (Au), silver (Ag), iridium (Ir), ruthenium (Ru) and mixtures of two or more thereof. Preferably, the noble metal is selected from the group consisting of palladium (Pd), platinum (Pt) and rhodium (Rh). More preferably, the noble metal is selected from palladium (Pd), platinum (Pt) and a mixture thereof.

Generally, it is preferred that the noble metal comprises, or consists of, palladium (Pd) and optionally a second metal selected from the group consisting of platinum (Pt), rhodium (Rh), gold (Au), silver (Ag), iridium (Ir) and ruthenium (Ru). Preferably, the noble metal comprises, or consists of, palladium (Pd) and optionally a second metal selected from the group consisting of platinum (Pt) and rhodium (Rh). Even more preferably, the noble metal comprises, or consists of, palladium (Pd) and optionally platinum (Pt). More preferably, the molecular sieve catalyst comprises palladium as the only noble metal.

When the noble metal comprises, or consists of, palladium (Pd) and a second metal, then the ratio by mass of palladium (Pd) to the second metal is >1:1. More preferably, the ratio by mass of palladium (Pd) to the second metal is >1:1 and the molar ratio of palladium (Pd) to the second metal is >1:1.

The molecular sieve catalyst may further comprise a base metal. Thus, the molecular sieve catalyst may comprise, or consist essentially of, a noble metal, a molecular sieve and optionally a base metal. The molecular sieve contains the noble metal and optionally the base metal.

The base metal may be selected from the group consisting of iron (Fe), copper (Cu), manganese (Mn), chromium (Cr), cobalt (Co), nickel (Ni), zinc (Zn) and tin (Sn), as well as mixtures of two or more thereof. It is preferred that the base metal is selected from the group consisting of iron, copper and cobalt, more preferably iron and copper. Even more preferably, the base metal is iron.

Alternatively, the molecular sieve catalyst may be substantially free of a base metal, such as a base metal selected from the group consisting of iron (Fe), copper (Cu), manganese (Mn), chromium (Cr), cobalt (Co), nickel (Ni), zinc (Zn) and tin (Sn), as well as mixtures of two or more thereof. Thus, the molecular sieve catalyst may not comprise a base metal.

In general, it is preferred that the molecular sieve catalyst does not comprise a base metal.

It may be preferable that the molecular sieve catalyst is substantially free of barium (Ba), more preferably the molecular sieve catalyst is substantially free of an alkaline earth metal. Thus, the molecular sieve catalyst may not comprise barium, preferably the molecular sieve catalyst does not comprise an alkaline earth metal.

The molecular sieve is typically composed of aluminium, silicon, and/or phosphorus. The molecular sieve generally has a three-dimensional arrangement (e.g. framework) of $SiO_4$, $AlO_4$, and/or $PO_4$ that are joined by the sharing of oxygen atoms. The molecular sieve may have an anionic framework. The charge of the anionic framework may be counterbalanced by cations, such as by cations of alkali and/or alkaline earth elements (e.g., Na, K, Mg, Ca, Sr, and Ba), ammonium cations and/or protons.

Typically, the molecular sieve has an aluminosilicate framework, an aluminophosphate framework or a silico-aluminophosphate framework. The molecular sieve may have an aluminosilicate framework or an aluminophosphate framework. It is preferred that the molecular sieve has an aluminosilicate framework or a silico-aluminophosphate framework. More preferably, the molecular sieve has an aluminosilicate framework.

When the molecular sieve has an aluminosilicate framework, then the molecular sieve is preferably a zeolite.

The molecular sieve contains the noble metal. The noble metal is typically supported on the molecular sieve. For example, the noble metal may be loaded onto and supported on the molecular sieve, such as by ion-exchange. Thus, the molecular sieve catalyst may comprise, or consist essentially of, a noble metal and a molecular sieve, wherein the molecular sieve contains the noble metal and wherein the noble metal is loaded onto and/or supported on the molecular sieve by ion exchange.

In general, the molecular sieve may be a metal-substituted molecular sieve (e.g. metal-substituted molecular sieve having an aluminosilicate or an aluminophosphate framework). The metal of the metal-substituted molecular sieve may be the noble metal (e.g. the molecular sieve is a noble metal substituted molecular sieve). Thus, the molecular sieve containing the noble metal may be a noble metal substituted molecular sieve. When the molecular sieve catalyst comprises a base metal, then the molecular sieve may be a noble and base metal-substituted molecular sieve. For the avoidance of doubt, the term "metal-substituted" embraces the term "ion-exchanged".

The molecular sieve catalyst generally has at least 1% by weight (i.e. of the amount of noble metal of the molecular sieve catalyst) of the noble metal located inside pores of the molecular sieve, preferably at least 5% by weight, more preferably at least 10% by weight, such as at least 25% by weight, even more preferably at least 50% by weight.

The molecular sieve may be selected from a small pore molecular sieve (i.e. a molecular sieve having a maximum ring size of eight tetrahedral atoms), a medium pore molecular sieve (i.e. a molecular sieve having a maximum ring size of ten tetrahedral atoms) and a large pore molecular sieve (i.e. a molecular sieve having a maximum ring size of twelve tetrahedral atoms). More preferably, the molecular sieve is selected from a small pore molecular sieve and a medium pore molecular sieve.

In a first molecular sieve catalyst embodiment, the molecular sieve is a small pore molecular sieve. The small pore molecular sieve preferably has a Framework Type selected from the group consisting of ACO, AEI, AEN, AFN, AFT, AFX, ANA, APC, APD, ATT, CDO, CHA, DDR, DFT, EAB, EDI, EPI, ERI, GIS, GOO, IHW, ITE, ITW, LEV, KFI, MER, MON, NSI, OWE, PAU, PHI, RHO, RTH, SAT, SAV, SIV, THO, TSC, UEI, UFI, VNI, YUG and ZON, as well as a mixture or intergrowth of any two or more thereof. The intergrowth is preferably selected from KFI-SIV, ITE-RTH, AEW-UEI, AEI-CHA, and AEI-SAV. More preferably, the small pore molecular sieve has a Framework Type that is AEI, CHA or an AEI-CHA intergrowth. Even more preferably, the small pore molecular sieve has a Framework Type that is AEI or CHA, particularly AEI.

Preferably, the small pore molecular sieve has an aluminosilicate framework or a silico-aluminophosphate framework. More preferably, the small pore molecular sieve has an aluminosilicate framework (i.e. the molecular sieve is a zeolite), especially when the small pore molecular sieve has a Framework Type that is AEI, CHA or an AEI-CHA intergrowth, particularly AEI or CHA.

In a second molecular sieve catalyst embodiment, the molecular sieve has a Framework Type selected from the group consisting of AEI, MFI, EMT, ERI, MOR, FER, BEA, FAU, CHA, LEV, MWW, CON and EUO, as well as mixtures of any two or more thereof.

In a third molecular sieve catalyst embodiment, the molecular sieve is a medium pore molecular sieve. The medium pore molecular sieve preferably has a Framework Type selected from the group consisting of MFI, FER, MWW and EUO, more preferably MFI.

In a fourth molecular sieve catalyst embodiment, the molecular sieve is a large pore molecular sieve. The large pore molecular sieve preferably has a Framework Type selected from the group consisting of CON, BEA, FAU, MOR and EMT, more preferably BEA.

In each of the first to fourth molecular sieve catalyst embodiments, the molecular sieve preferably has an aluminosilicate framework (e.g. the molecular sieve is a zeolite). Each of the aforementioned three-letter codes represents a framework type in accordance with the "IUPAC Commission on Zeolite Nomenclature" and/or the "Structure Commission of the International Zeolite Association".

In any one of the first to fourth molecular sieve catalyst embodiments, it may generally be preferred that the molecular sieve (e.g. large pore, medium pore or small pore) has a framework that is not an intergrowth of at least two different Framework Types.

The molecular sieve typically has a silica to alumina molar ratio (SAR) of 10 to 200 (e.g. 10 to 40), such as 10 to 100, more preferably 15 to 80 (e.g. 15 to 30). The SAR generally relates to a molecular having an aluminosilicate framework (e.g. a zeolite) or a silico-aluminophosphate framework, preferably an aluminosilicate framework (e.g. a zeolite).

The molecular sieve catalyst of the first, third and fourth molecular sieve catalyst embodiments (and also for some of the Framework Types of the second molecular sieve catalyst embodiment), particularly when the molecular sieve is a zeolite, may have an infrared spectrum having a characteristic absorption peak in a range of from 750 $cm^{-1}$ to 1050 $cm^{-1}$ (in addition to the absorption peaks for the molecular sieve itself). Preferably, the characteristic absorption peak is in the range of from 800 $cm^{-1}$ to 1000 $cm^{-1}$, more preferably in the range of from 850 $cm^{-1}$ to 975 $cm^{-1}$.

The molecular sieve catalyst of the first molecular sieve catalyst embodiment has been found to have advantageous passive $NO_x$ adsorber (PNA) activity. The molecular sieve catalyst can be used to store $NO_x$ when exhaust gas temperatures are relatively cool, such as shortly after start-up of a lean burn engine. $NO_x$ storage by the molecular sieve catalyst occurs at low temperatures (e.g. less than 200° C.). As the lean burn engine warms up, the exhaust gas temperature increases and the temperature of the molecular sieve catalyst will also increase. The molecular sieve catalyst will release adsorbed $NO_x$ at these higher temperatures (e.g. 200° C. or above).

It has also been unexpectedly found that the molecular sieve catalyst, particularly the molecular sieve catalyst of the second molecular sieve catalyst embodiment has cold start catalyst activity. Such activity can reduce emissions during the cold start period by adsorbing $NO_x$ and hydrocarbons (HCs) at relatively low exhaust gas temperatures (e.g. less than 200° C.). Adsorbed $NO_x$ and/or HCs can be released when the temperature of the molecular sieve catalyst is close to or above the effective temperature of the other catalyst components or emissions control devices for oxidising NO and/or HCs.

The $NO_x$ absorber catalyst of the invention also comprises a second $NO_x$ absorber material.

Generally, the second $NO_x$ absorber material is a passive $NO_x$ absorber (PNA) catalyst (i.e. it has PNA activity).

Typically, the $NO_x$ release temperature of the second $NO_x$ absorber material is higher than the $NO_x$ release temperature of the first $NO_x$ absorber material. More preferably, the $NO_x$ storage temperature of the second $NO_x$ absorber material is higher than the $NO_x$ storage temperature of the first $NO_x$ absorber material.

The second $NO_x$ absorber material comprises, or consists essentially of, palladium (Pd) supported on an oxide of cerium.

The palladium is generally disposed directly onto or is directly supported by the oxide of cerium (e.g. there is no intervening support material between the palladium and the oxide of cerium). It is preferred that the palladium is in direct contact with the oxide of cerium.

The oxide of cerium is preferably ceria ($CeO_2$). Alternatively, the oxide of cerium may be a mixed or composite oxide of ceria and a second oxide. The second oxide may be selected from the group consisting of zirconia, alumina, lanthanum and a combination of two or more thereof. It may be preferable that the second oxide is zirconia or a combination of zirconia and alumina.

The mixed or composition oxide typically comprises at least 45% by weight ceria, preferably at least 50% by weight ceria, more preferably at least 55% by weight ceria, such as at least 70% by weight ceria.

Typically, the mixed or composite oxide consists essentially of 20 to 95% by weight of ceria and 5 to 80% by weight of the second oxide (e.g. 50 to 95% by weight ceria and 5 to 50% by weight of the second oxide), preferably 35 to 80% by weight of ceria and 20 to 65% by weight of the second oxide (e.g. 55 to 80% by weight ceria and 20 to 45% by weight of the second oxide), even more preferably 45 to 75% by weight of ceria and 25 to 55% by weight of the second oxide.

In addition to the second oxide, the mixed or composite oxide may further comprise a total of 1 to 15% by weight, preferably 2 to 12.5% by weight (e.g. 5 to 10% by weight), of an oxide or oxides of a second rare earth metal (e.g. the second rare earth metal is not cerium). The second rare earth metal is typically selected from the group consisting of lanthanum (La), praseodymium (Pr) and combinations thereof. When the mixed or composite oxide comprises a second rare earth metal, then the sum of the % weight of ceria, the % weight of the second oxide and the % weight of the second rare earth metal is ≤100%.

The oxide of cerium, the ceria or the mixed or composite oxide may be doped with a dopant.

The total amount of dopant is typically 0.1 to 5% by weight (i.e. of the oxide of cerium, ceria or the ceria-zirconia), preferably 0.25 to 3% by weight, such as 0.25 to 2.5% by weight, more preferably 0.5 to 1.5% by weight (e.g. about 1% by weight). The inclusion of a dopant can impart thermal stability.

The dopant may be an element or an oxide thereof, wherein the element is selected from the group consisting of tungsten (W), silicon (Si), titanium (Ti), lanthanum (La), praseodymium (Pr), hafnium (Hf), yttrium (Y), ytterbium (Yb), samarium (Sm), neodymium (Nd) and a combination of two or more thereof.

It may be preferable that the oxide of cerium, the ceria or the mixed or composite oxide is not doped with a dopant.

Typically, the oxide of cerium, the ceria or the mixed or composite oxide has a high surface area, such as 30 to 300 $m^2/g$, preferably 60 to 200 $m^2/g$. The surface area is measured using conventional nitrogen physisorption techniques.

The second $NO_x$ absorber material typically comprises a concentration (e.g. g ft$^{-3}$) of palladium (Pd) of 0.25 to 10% by weight (e.g. of 0.25 to 4% by weight or 0.4 to 3.5% by weight). It is preferred that the concentration of palladium (Pd) is 0.5 to 7.5% by weight, more preferably 0.75 to 5% by weight. The concentration of palladium (Pd) is given as a % by weight of the concentration of the oxide of cerium.

It may be preferable that the concentration of palladium (Pd) is ≤2% by weight of the concentration of the oxide of cerium. More preferably the concentration of palladium (Pd) is 0.25 to 1.9% by weight, more preferably 0.4 to 1.8% by weight, such as 0.5 to 1.75% by weight, and even more preferably 0.75 to 1.5% by weight, of the concentration of the oxide of cerium. Advantageous PNA activity can be obtained when the concentration of palladium is less than 2% by weight of the oxide of cerium.

In general, the second $NO_x$ absorber material comprises a ratio by weight of palladium (Pd) to cerium (Ce) of 1:1000 to 1:10, preferably 1:500 to 1:15, more preferably 1:200 to 1:20. It may be preferable that the second $NO_x$ absorber material comprises a ratio by weight of cerium (Ce) to palladium (Pd) of ≥20:1, more preferably ≥25:1, such as ≥30:1, even more preferably ≥40:1.

It is preferred that the second $NO_x$ absorber material comprises, or consists essentially of, ceria (i.e. ceria which is not a mixed or composite oxide of ceria and a second oxide).

The second $NO_x$ absorber material may further comprise platinum. The platinum may be disposed directly onto or is directly supported by the oxide of cerium (e.g. there is no intervening support material between the platinum and the oxide of cerium). It is preferred that the platinum is in direct contact with the oxide of cerium.

When the second $NO_x$ absorber material further comprises platinum, then preferably the second $NO_x$ absorber material has a ratio by mass of palladium (Pd) to platinum (Pt) of >1:1, such as >1.25:1, preferably >2:1, more preferably >3:1 (e.g. >4:1), and even more preferably >5:1.

Alternatively, the second $NO_x$ absorber material may be substantially free of platinum (Pt). More preferably, the second $NO_x$ absorber material does not comprise platinum (Pt).

The $NO_x$ absorber catalyst of the invention may have one of several arrangements that facilitate the storage and release of $NO_x$, and which may provide a broader temperature window for $NO_x$ storage and release.

In a first arrangement, the $NO_x$ absorber catalyst comprises, or consists essentially of, a mixture of the first $NO_x$ absorber material and the second $NO_x$ absorber material. The $NO_x$ absorber catalyst may comprise, or consist essentially of, a region comprising, or consisting essentially of, the first $NO_x$ absorber material and the second $NO_x$ absorber material (i.e. the first $NO_x$ absorber material and the second $NO_x$ absorber material are present in the same region).

An example of a first arrangement of the $NO_x$ absorber catalyst is illustrated in FIG. 1.

The region may be disposed or supported on the substrate. It is preferred that the region is directly disposed or directly supported on the substrate (i.e. the region is in direct contact with a surface of the substrate).

In the first arrangement, the region may be a zone. The zone typically has a length of 10 to 90% of the length of the substrate (e.g. 10 to 45%), preferably 15 to 75% of the length of the substrate (e.g. 15 to 40%), more preferably 20 to 70% (e.g. 30 to 65%, such as 25 to 45%) of the length of the substrate, still more preferably 25 to 65% (e.g. 35 to 50%).

Alternatively, the region may be a layer. The layer may extend for an entire length (i.e. substantially an entire length) of the substrate, particularly the entire length of the channels of a substrate monolith.

It is preferred in the first arrangement that the second $NO_x$ absorber material comprises, or consists essentially of, platinum and/or palladium supported on an oxide of cerium. More preferably, the second $NO_x$ absorber material comprises, or consists essentially, of palladium supported on an oxide of cerium.

In the first arrangement, the region is preferably substantially free of rhodium and/or a $NO_x$ storage component comprising, or consisting essentially of, an oxide, a carbonate or a hydroxide of an alkali metal, an alkaline earth metal and/or a rare earth metal (except for an oxide of cerium (i.e. from the second $NO_x$ absorber material).

In addition to providing a broader temperature window for $NO_x$ storage and release, the first arrangement may prevent the first $NO_x$ absorber material from becoming deactivated (e.g. to $NO_x$ storage) when it is exposed to an exhaust gas having a rich composition. The second $NO_x$ absorber material may protect the first $NO_x$ absorber material from deactivation, especially when it is mixed with the first $NO_x$ absorber material, such as in the first arrangement.

Figure 2:
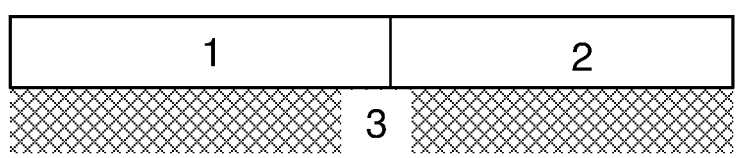

In a second arrangement, the $NO_x$ absorber catalyst comprises a first zone and a second zone. The first zone comprises, or consists essentially of, the first $NO_x$ absorber material. The second zone comprises, or consists essentially of, the second $NO_x$ absorber material. An example of the second arrangement of the $NO_x$ absorber catalyst is illustrated in FIG. 2.

The first zone may be disposed upstream of the second zone. Alternatively, the first zone may be disposed downstream of the second zone. It is preferred that the first zone is disposed upstream of the second zone.

When the first zone is disposed upstream of the second zone, then the first zone may be disposed at an inlet end of the substrate and/or the second zone may be disposed at an outlet end of the substrate.

When the first zone is disposed downstream of the second zone, then the first zone may be disposed at an outlet end of the substrate and/or the second zone may be disposed at an inlet end of the substrate.

The first zone may adjoin the second zone. Preferably, the first zone is contact with the second zone.

When the first zone adjoins and/or is in contact with the second zone, then the combination of the first zone and the second zone may be disposed or supported on the substrate as a layer (e.g. a single layer). Thus, a layer (e.g. a single) may be formed on the substrate when the first and second zones adjoin or are in contact with one another. Such an arrangement may avoid problems with back pressure.

Typically, the first zone and/or the second zone is disposed or supported on the substrate. Preferably, the first zone and/or the second zone is disposed directly on to the substrate (i.e. the first zone and/or second zone is in contact with a surface of the substrate).

Figure 3:
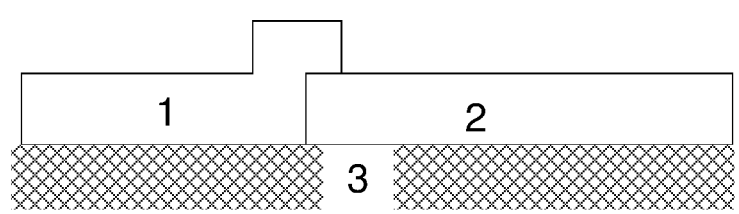
Figure 4:
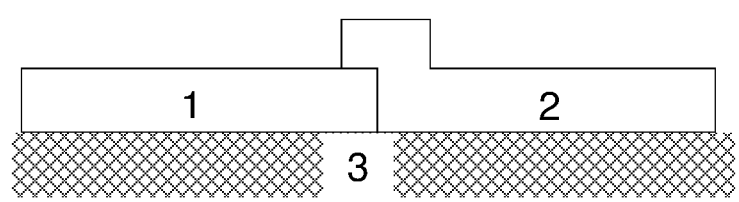

In a third arrangement, the $NO_x$ absorber catalyst comprises a first region and a second region. The first region comprises, or consists essentially of, the first $NO_x$ absorber material. The second region comprises, or consists essentially of, the second $NO_x$ absorber material. In the third arrangement, either the first region overlaps the second region (see, for example, FIG. 3) or the second region overlaps the first region (see, for example, FIG. 4).

The second region may be disposed directly on to the substrate (i.e. the second region is in contact with a surface of the substrate). The first region may be:
(a) disposed or supported on the second region; and/or
(b) disposed directly on to the substrate [i.e. the first region is in contact with a surface of the substrate]; and/or
(c) in contact with the second region [i.e. the first region is adjacent to, or abuts, the second region].

A part or portion of the first region may be disposed or supported on the second region (e.g. the first region may overlap the second region). See, for example, the arrangement illustrated in FIG. 3. The second region may be a second zone and the first region may be a first layer or a first zone.

When a part or portion of the first region is disposed or supported on the second region, then preferably the part or portion of the first region is disposed directly on to the second region (i.e. the first region is in contact with a surface of the second region).

Alternatively, a part or portion of the second region may be disposed or supported on the first region (e.g. the second region may overlap the first region). See, for example, the arrangement illustrated in FIG. 4. The first region may be a first zone and the second region may be a second layer or a second zone.

When a part or portion of the second region is disposed or supported on the first region, then preferably the part or portion of the second region is disposed directly on to the first region (i.e. the second region is in contact with a surface of the first region).

In the third arrangement, the first region may be disposed upstream of the second region. For example, the first region may be disposed at an inlet end of the substrate and the second region may be disposed at an outlet end of the substrate.

Alternatively, the first region may be disposed downstream of the second region. For example, the first region may be disposed at an outlet end of the substrate and the second region may be disposed at an inlet end of the substrate.

In the third arrangement, the second region may be a second layer and the first region may be a first zone, wherein the first zone is disposed on the second layer. Preferably the first zone is disposed directly on to the second layer (i.e. the first zone is in contact with a surface of the second layer). Alternatively, the first region may be a first layer and the second region may be a second zone, wherein the second zone is disposed on the first layer. Preferably the second zone is disposed directly on to the first layer (i.e. the second zone is in contact with a surface of the first layer).

When the first zone is disposed or supported on the second layer, it is preferred that the entire length of the first zone is disposed or supported on the second layer. The length of the first zone is less than the length of the second layer. It is preferred that first zone is disposed on the second layer at an outlet end of the substrate.

When the second zone is disposed or supported on the first layer, it is preferred that the entire length of the second zone is disposed or supported on the first layer. The length of the second zone is less than the length of the first layer. It is preferred that second zone is disposed on the first layer at an inlet end of the substrate.

In a fourth arrangement, the $NO_x$ absorber catalyst comprises a first layer and a second layer. The first layer comprises, or consists essentially of, the first $NO_x$ absorber material. The second layer comprises, or consists essentially of, the second $NO_x$ absorber material.

Figure 5:
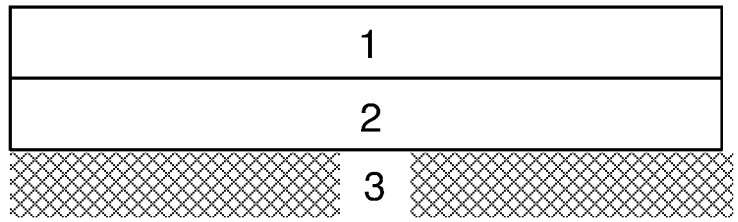

The first layer may be disposed on, preferably disposed directly on to, the second layer (see, for example, the arrangement illustrated in FIG. 5). The second layer may be disposed on the substrate. Preferably, the second layer is disposed directly on to the substrate.

Figure 6:
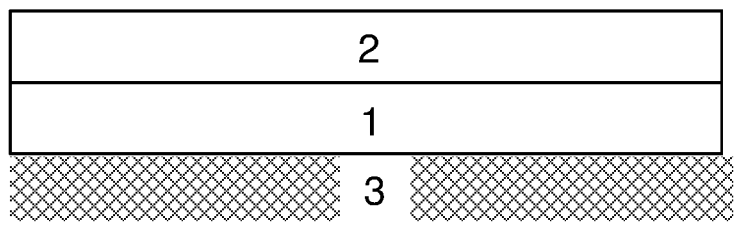
FIG. 6 shows a $NO_x$ absorber catalyst having a first layer comprising the first $NO_x$ absorber material (1) disposed on the substrate (3). A second layer comprising the second $NO_x$ absorber material (2) is disposed on the first layer.
Figure 7:
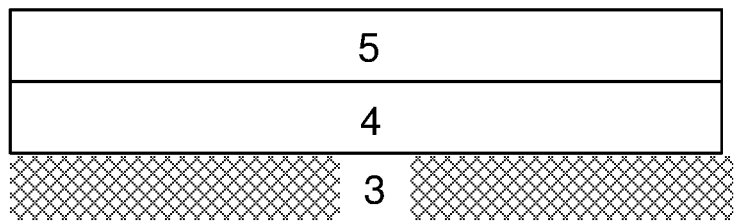
FIG. 7 shows a $NO_x$ absorber catalyst having a layer (5) comprising a diesel oxidation catalyst material disposed on a second region/layer (4). The second region/layer (4) comprises the first $NO_x$ absorber material and the second $NO_x$ absorber material. The second region/layer (4) is disposed on the substrate (3).
Figure 8:
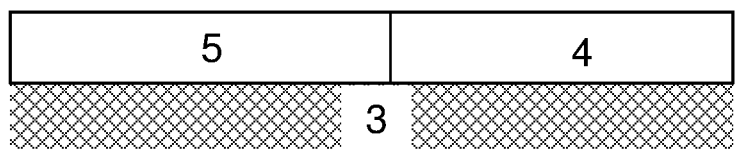
FIG. 8 shows a $NO_x$ absorber catalyst having a zone comprising a diesel oxidation catalyst material (5). The second region/zone (4) comprises the first $NO_x$ absorber material and the second $NO_x$ absorber material.

Alternatively, the second layer may be disposed on, preferably disposed directly on to, the first layer (see, for example, the arrangement illustrated in FIG. 6). The first layer may be disposed on the substrate. Preferably, the first layer is disposed directly on to the substrate.

The second to fourth arrangements of the $NO_x$ absorber catalyst of the invention may be advantageous when the second $NO_x$ absorber material is arranged to come into contact with all or most of any inlet exhaust gas before the first $NO_x$ absorber material (e.g. when the second $NO_x$ absorber material is upstream of the first $NO_x$ absorber material and/or in a layer above the first $NO_x$ absorber material). When the exhaust gas has a rich composition, these arrangements reduce the likelihood of deactivation of the molecular sieve catalyst.

For the avoidance of doubt, the first region is different (i.e. different composition) to the second region.

In general, with reference to the second and third arrangements, when the first region is a first zone, then the first zone typically has a length of 10 to 90% of the length of the substrate (e.g. 10 to 45%), preferably 15 to 75% of the length of the substrate (e.g. 15 to 40%), more preferably 20 to 70% (e.g. 30 to 65%, such as 25 to 45%) of the length of the substrate, still more preferably 25 to 65% (e.g. 35 to 50%).

When the second region is a second zone, then generally the second zone has a length of 10 to 90% of the length of the substrate (e.g. 10 to 45%), preferably 15 to 75% of the length of the substrate (e.g. 15 to 40%), more preferably 20 to 70% (e.g. 30 to 65%, such as 25 to 45%) of the length of the substrate, still more preferably 25 to 65% (e.g. 35 to 50%).

In the second to fourth arrangements, when the first region is a first layer, then typically the first layer extends for an entire length (i.e. substantially an entire length) of the substrate, particularly the entire length of the channels of a substrate monolith.

In general, when the second region is a second layer, then typically the second layer typically extends for an entire length (i.e. substantially an entire length) of the substrate, particularly the entire length of the channels of a substrate monolith.

In the second to fourth arrangements, the first region is preferably substantially free of rhodium and/or a $NO_x$ storage component comprising, or consisting essentially of, an oxide, a carbonate or a hydroxide of an alkali metal, an alkaline earth metal and/or a rare earth metal. More preferably, the first region does not comprise rhodium and/or a $NO_x$ storage component comprising, or consisting essentially of, an oxide, a carbonate or a hydroxide of an alkali metal, an alkaline earth metal and/or a rare earth metal. Thus, first region is preferably not a lean $NO_x$ trap (LNT) region (i.e. a region having lean $NO_x$ trap activity).

It may preferable, in the second to fourth arrangements, that the first region is substantially free of platinum. More preferably, the first region does not comprise platinum.

Additionally or alternatively in the second to fourth arrangements, the second region is preferably substantially free of rhodium and/or a $NO_x$ storage component comprising, or consisting essentially of, an oxide, a carbonate or a hydroxide of an alkali metal, an alkaline earth metal and/or a rare earth metal (except for an oxide of cerium (i.e. from the second $NO_x$ absorber material)). More preferably, the second region does not comprise rhodium and/or a $NO_x$ storage component comprising, or consisting essentially of, an oxide, a carbonate or a hydroxide of an alkali metal, an alkaline earth metal and/or a rare earth metal (except for an oxide of cerium (i.e. from the second $NO_x$ absorber material)). Thus, second region is preferably not a lean $NO_x$ trap (LNT) region (i.e. a region having lean $NO_x$ trap activity).

Generally, in the second to fourth arrangements, it may be preferable that the first region is substantially free of an oxide of cerium, such as ceria. Thus, the first region may not comprise an oxide of cerium, such as ceria.

In a fifth arrangement of the invention, the $NO_x$ absorber catalyst has an arrangement as defined in any one of the first to fourth arrangements described above and further comprises a diesel oxidation catalyst (DOC) region. The DOC region has diesel oxidation catalyst activity. Thus, the DOC region is able to oxidise carbon monoxide (CO) and/or hydrocarbons (HCs) and optionally nitric oxide (NO).

The DOC region may be a DOC zone. The DOC zone typically has a length of 10 to 90% (e.g. 10 to 45 (Y0) of the length of the substrate, preferably 15 to 75% of the length of the substrate (e.g. 15 to 40%), more preferably 20 to 60% (e.g. 30 to 55% or 25 to 45% of the length of the substrate, still more preferably 25 to 50% (e.g. 25 to 40%).

The DOC region is preferably disposed upstream of the first $NO_x$ absorber material and the second $NO_x$ absorber material. It is preferred that the DOC region is disposed at an inlet end of the substrate. More preferably, the DOC region is a DOC zone disposed at an inlet end of the substrate.

Alternatively, the DOC region may be a DOC layer. The DOC layer may extend for an entire length (i.e. substantially an entire length) of the substrate, particularly the entire length of the channels of a substrate monolith.

The DOC layer is preferably disposed on the first $NO_x$ absorber material and the second $NO_x$ absorber material. Thus, the DOC layer will come into contact with an inlet exhaust gas before the first $NO_x$ absorber material and the second $NO_x$ absorber material.

The $NO_x$ absorber catalyst of the invention, including any one of the first to fifth arrangements, preferably does not comprise a SCR catalyst (e.g. a region comprising a SCR catalyst), particularly a SCR catalyst comprising a metal selected from the group consisting of cerium (Ce), chromium (Cr), cobalt (Co), copper (Cu), iron (Fe), manganese (Mn), molybdenum (Mo), nickel (Ni), tungsten (W), vanadium (V) or a combination of any two or more thereof.

The regions, zones and layers described hereinabove may be prepared using conventional methods for making and applying washcoats onto a substrate are also known in the art (see, for example, our WO 99/47260, WO 2007/077462 and WO 2011/080525).

The region of the first arrangement and the first region of the second to fourth arrangements typically comprise a total loading of noble metal (i.e. of the first $NO_x$ absorber material, particularly the molecular sieve catalyst, in the first region) of $\geq 1$ g ft$^{-3}$, preferably $>1$ g ft$^{-3}$, and more preferably $>2$ g ft$^{-3}$.

In general, the region of the first arrangement comprises a total loading of noble metal (e.g. including both the first $NO_x$ absorber material and the second $NO_x$ absorber material) of 5 to 550 g ft$^{-3}$, preferably 15 to 400 g ft$^{-3}$ (e.g. 75 to 350 g ft$^{-3}$), more preferably 25 to 300 g ft$^{-3}$ (e.g. 50 to 250 g ft$^{-3}$), still more preferably 30 to 150 g ft$^{-3}$.

For the second to fourth arrangements, the first region typically comprises a total loading of noble metal (i.e. of the first $NO_x$ absorber material, particularly the molecular sieve catalyst, in the first region) of 1 to 250 g ft$^{-3}$, preferably 5 to 150 g ft$^{-3}$, more preferably 10 to 100 g ft$^{-3}$.

The second region, in the second to fourth arrangements, typically has a total loading of platinum group metal (e.g. the palladium of second $NO_x$ absorber material) of 5 to 300 g ft$^{-3}$. It is preferred that the second region has a total loading of the PGM of 10 to 250 g ft$^{-3}$ (e.g. 75 to 175 g ft$^{-3}$), more preferably 15 to 200 g ft$^{-3}$ (e.g. 50 to 150 g ft$^{-3}$), still more preferably 20 to 150 g ft$^{-3}$.

The region of the first arrangement or the second region of the second to fourth arrangements may comprise an amount of the oxide of cerium (e.g. the amount of the oxide of cerium of the second $NO_x$ absorber material) of 0.1 to 4.5 g in$^{-3}$ (e.g. 0.25 to 4.2 g in$^{-3}$), preferably 0.3 to 3.8 g in$^{-3}$, still more preferably 0.5 to 3.0 g in$^{-3}$ (1 to 2.75 g in$^{-3}$ or 0.75 to 1.5 g in$^{-3}$), and even more preferably 0.6 to 2.5 g in$^{-3}$ (e.g. 0.75 to 2.3 g in$^{-3}$).

In the first arrangement, the region comprising the mixture of the first $NO_x$ absorber material and the second $NO_x$ absorber material may further comprise a hydrocarbon adsorbent material. In the second to fourth arrangements, the second region may further comprise a hydrocarbon adsorbent material.

The hydrocarbon adsorbent material is typically a zeolite, preferably a zeolite that does not contain a noble metal and/or a base metal. It is preferred that the zeolite is a medium pore zeolite (e.g. a zeolite having a maximum ring size of ten tetrahedral atoms) or a large pore zeolite (e.g. a zeolite having a maximum ring size of twelve tetrahedral atoms). It may be preferable that the zeolite is not a small pore zeolite (e.g. a zeolite having a maximum ring size of eight tetrahedral atoms).

Examples of suitable zeolites or types of zeolite include faujasite, clinoptilolite, mordenite, silicalite, ferrierite, zeolite X, zeolite Y, ultrastable zeolite Y, AEI zeolite, ZSM-5 zeolite, ZSM-12 zeolite, ZSM-20 zeolite, ZSM-34 zeolite, CHA zeolite, SSZ-3 zeolite, SAPO-5 zeolite, off retite, a beta zeolite or a copper CHA zeolite. The zeolite is preferably ZSM-5, a beta zeolite or a Y zeolite.

When the second region comprises a hydrocarbon adsorbent, the total amount of hydrocarbon adsorbent is 0.05 to 3.00 g in$^{-3}$, particularly 0.10 to 2.00 g in$^{-3}$, more particularly 0.2 to 1.0 g in$^{-3}$. For example, the total amount of hydrocarbon adsorbent may be 0.8 to 1.75 g in$^{-3}$, such as 1.0 to 1.5 g in$^{-3}$.

It may generally be preferable that the region of the first arrangement or the second region of the second to fourth arrangements is substantially free of a hydrocarbon adsorbent material, particularly a zeolite. Thus, the region of the first arrangement or the second region of the second to fourth arrangements may not comprise a hydrocarbon adsorbent material.

In the second to fourth arrangements, it may be further preferable that the second region is substantially free of a molecular sieve catalyst, such as the molecular sieve catalyst described herein above. Thus, the second region may not comprise the molecular sieve catalyst.

The $NO_x$ absorber catalyst of the invention comprises a substrate having an inlet end and an outlet end.

The substrate typically has a plurality of channels (e.g. for the exhaust gas to flow through). Generally, the substrate is a ceramic material or a metallic material.

It is preferred that the substrate is made or composed of cordierite ($SiO_2$—$Al_2O_3$—$MgO$), silicon carbide (SiC), Fe—Cr—Al alloy, Ni—Cr—Al alloy, or a stainless steel alloy.

Typically, the substrate is a monolith (also referred to herein as a substrate monolith). Such monoliths are well-known in the art. The substrate monolith may be a flow-through monolith or a filtering monolith.

A flow-through monolith typically comprises a honeycomb monolith (e.g. a metal or ceramic honeycomb monolith) having a plurality of channels extending therethrough, which each channel is open at the inlet end and the outlet end.

A filtering monolith generally comprises a plurality of inlet channels and a plurality of outlet channels, wherein the inlet channels are open at an upstream end (i.e. exhaust gas inlet side) and are plugged or sealed at a downstream end (i.e. exhaust gas outlet side), the outlet channels are plugged or sealed at an upstream end and are open at a downstream end, and wherein each inlet channel is separated from an outlet channel by a porous structure.

When the monolith is a filtering monolith, it is preferred that the filtering monolith is a wall-flow filter. In a wall-flow filter, each inlet channel is alternately separated from an outlet channel by a wall of the porous structure and vice versa. It is preferred that the inlet channels and the outlet channels are arranged in a honeycomb arrangement. When there is a honeycomb arrangement, it is preferred that the channels vertically and laterally adjacent to an inlet channel are plugged at an upstream end and vice versa (i.e. the channels vertically and laterally adjacent to an outlet channel are plugged at a downstream end). When viewed from either end, the alternately plugged and open ends of the channels take on the appearance of a chessboard.

In principle, the substrate may be of any shape or size. However, the shape and size of the substrate is usually selected to optimise exposure of the catalytically active materials in the catalyst to the exhaust gas. The substrate may, for example, have a tubular, fibrous or particulate form. Examples of suitable supporting substrates include a substrate of the monolithic honeycomb cordierite type, a substrate of the monolithic honeycomb SiC type, a substrate of the layered fibre or knitted fabric type, a substrate of the foam type, a substrate of the crossflow type, a substrate of the metal wire mesh type, a substrate of the metal porous body type and a substrate of the ceramic particle type.

The substrate may be an electrically heatable substrate (i.e. the electrically heatable substrate is an electrically heating substrate, in use). When the substrate is an electrically heatable substrate, the $NO_x$ absorber catalyst of the invention comprises an electrical power connection, preferably at least two electrical power connections, more preferably only two electrical power connections. Each electrical power connection may be electrically connected to the electrically heatable substrate and an electrical power source. The $NO_x$ absorber catalyst can be heated by Joule heating, where an electric current through a resistor converts electrical energy into heat energy.

The electrically heatable substrate can be used to release any stored $NO_x$ from the first region. Thus, when the electrically heatable substrate is switched on, the $NO_x$ absorber catalyst will be heated and the temperature of the molecular sieve catalyst can be brought up to its $NO_x$ release temperature. Examples of suitable electrically heatable substrates are described in U.S. Pat. Nos. 4,300,956, 5,146,743 and 6,513,324.

In general, the electrically heatable substrate comprises a metal. The metal may be electrically connected to the electrical power connection or electrical power connections.

Typically, the electrically heatable substrate is an electrically heatable honeycomb substrate. The electrically heatable substrate may be an electrically heating honeycomb substrate, in use.

The electrically heatable substrate may comprise an electrically heatable substrate monolith (e.g. a metal monolith). The monolith may comprise a corrugated metal sheet or foil. The corrugated metal sheet or foil may be rolled, wound or stacked. When the corrugated metal sheet is rolled or wound, then it may be rolled or wound into a coil, a spiral shape or a concentric pattern.

The metal of the electrically heatable substrate, the metal monolith and/or the corrugated metal sheet or foil may comprise an aluminium ferritic steel, such as Fecralloy™.

The invention also provides an exhaust system comprising the $NO_x$ absorber catalyst and an emissions control device. Examples of an emissions control device include a diesel particulate filter (DPF), a lean $NO_x$ trap (LNT), a lean $NO_x$ catalyst (LNC), a selective catalytic reduction (SCR) catalyst, a diesel oxidation catalyst (DOC), a catalysed soot filter (CSF), a selective catalytic reduction filter (SCRF™)

catalyst, an ammonia slip catalyst (ASC) and combinations of two or more thereof. Such emissions control devices are all well known in the art.

It is preferred that the exhaust system comprises an emissions control device selected from the group consisting of a lean $NO_x$ trap (LNT), an ammonia slip catalyst (ASC), diesel particulate filter (DPF), a selective catalytic reduction (SCR) catalyst, a catalysed soot filter (CSF), a selective catalytic reduction filter (SCRF™) catalyst, and combinations of two or more thereof. More preferably, the emissions control device is selected from the group consisting of a lean $NO_x$ trap (LNT), a selective catalytic reduction (SCR) catalyst, a selective catalytic reduction filter (SCRF™) catalyst, and combinations of two or more thereof.

In a preferred exhaust system of the invention, the emissions control device is a LNT. The $NO_x$ release temperature of the $NO_x$ absorber catalyst of the invention may overlap with a $NO_x$ storage temperature of a LNT. The $NO_x$ absorber catalyst of the invention may be used in conjunction with a LNT and a SCR or SCRF™ catalyst (e.g. an exhaust system comprising a PNA+LNT+SCR or SCRF™, in that order) to provide a broad temperature window for the storage and treatment of $NO_x$.

In general, the exhaust system of the invention may further comprise means for introducing hydrocarbon into the exhaust gas.

The means for introducing hydrocarbon into the exhaust gas may comprise, or consist of, a hydrocarbon supply apparatus (e.g. for generating a rich exhaust gas). The hydrocarbon supply apparatus may be electronically coupled to an engine management system, which is configured to inject hydrocarbon into the exhaust gas typically for releasing $NO_x$ (e.g. stored $NO_x$) from a LNT.

The hydrocarbon supply apparatus may be an injector. The hydrocarbon supply apparatus or injector is suitable for injecting fuel into the exhaust gas. The hydrocarbon supply apparatus is typically disposed downstream of the exhaust outlet of the lean burn engine. The hydrocarbon supply apparatus may be upstream or downstream of the $NO_x$ absorber catalyst of the invention.

Alternatively or in addition to the hydrocarbon supply apparatus, the lean burn engine may comprise an engine management system (e.g. an engine control unit [ECU]). The engine management system may be configured for in-cylinder injection of the hydrocarbon (e.g. fuel) typically for releasing $NO_x$ (e.g. stored $NO_x$) from a LNT.

Generally, the engine management system is coupled to a sensor in the exhaust system, which monitors the status of a LNT. Such a sensor may be disposed downstream of the LNT. The sensor may monitor the $NO_x$ composition of the exhaust gas at the outlet of the LNT.

In general, the hydrocarbon is fuel, preferably diesel fuel. When the hydrocarbon is fuel, such as diesel fuel, it is preferred that the fuel comprises 50 ppm of sulfur, more preferably 15 ppm of sulfur, such as 10 ppm of sulfur, and even more preferably 5 ppm of sulfur.

In the first to fourth arrangements of the $NO_x$ absorber catalyst of the invention, the hydrocarbon supply apparatus may be disposed upstream of the $NO_x$ absorber catalyst of the invention.

When the exhaust system of the invention comprises an SCR catalyst or an SCRF™ catalyst, then the exhaust system may further comprise an injector for injecting a nitrogenous reductant, such as ammonia, or an ammonia precursor, such as urea or ammonium formate, preferably urea, into exhaust gas downstream of the oxidation catalyst and upstream of the SCR catalyst or the SCRF™ catalyst.

Such an injector may be fluidly linked to a source (e.g. a tank) of a nitrogenous reductant precursor. Valve-controlled dosing of the precursor into the exhaust gas may be regulated by suitably programmed engine management means and closed loop or open loop feedback provided by sensors monitoring the composition of the exhaust gas. Ammonia can also be generated by heating ammonium carbamate (a solid) and the ammonia generated can be injected into the exhaust gas.

Alternatively or in addition to the injector for injecting a nitrogenous reductant, ammonia can be generated in situ (e.g. during rich regeneration of a LNT disposed upstream of the SCR catalyst or the SCRF™ catalyst), such as when the exhaust system further comprises a hydrocarbon supply apparatus, such as an engine management system configured for in-cylinder injection of a hydrocarbon for releasing $NO_x$ (e.g. stored $NO_x$) from a LNT.

The SCR catalyst or the SCRF™ catalyst may comprise a metal selected from the group consisting of at least one of Cu, Hf, La, Au, In, V, lanthanides and Group VIII transition metals (e.g. Fe), wherein the metal is supported on a refractory oxide or molecular sieve. The metal is preferably selected from Ce, Fe, Cu and combinations of any two or more thereof, more preferably the metal is Fe or Cu.

The refractory oxide for the SCR catalyst or the SCRF™ catalyst may be selected from the group consisting of $Al_2O_3$, $TiO_2$, $CeO_2$, $SiO_2$, $ZrO_2$ and mixed oxides containing two or more thereof. The non-zeolite catalyst can also include tungsten oxide (e.g. $V_2O_5/WO_3/TiO_2$, $WO_x/CeZrO_2$, $WO_x/ZrO_2$ or $Fe/WO_xZrO_2$).

It is particularly preferred when an SCR catalyst, an SCRF™ catalyst or a washcoat thereof comprises at least one molecular sieve, such as an aluminosilicate zeolite or a SAPO. The at least one molecular sieve can be a small, a medium or a large pore molecular sieve. By "small pore molecular sieve" herein we mean molecular sieves containing a maximum ring size of 8, such as CHA; by "medium pore molecular sieve" herein we mean a molecular sieve containing a maximum ring size of 10, such as ZSM-5; and by "large pore molecular sieve" herein we mean a molecular sieve having a maximum ring size of 12, such as beta. Small pore molecular sieves are potentially advantageous for use in SCR catalysts.

Preferred molecular sieves for an SCR catalyst or an SCRF™ catalyst are synthetic aluminosilicate zeolite molecular sieves selected from the group consisting of AEI, ZSM-5, ZSM-20, ERI including ZSM-34, mordenite, ferrierite, BEA including Beta, Y, CHA, LEV including Nu-3, MCM-22 and EU-1, preferably AEI or CHA, and having a silica-to-alumina ratio of about 10 to about 50, such as about 15 to about 40.

In a first exhaust system embodiment of the invention, the exhaust system comprises the $NO_x$ absorber catalyst of the invention (including any one of the first to fifth arrangements of the $NO_x$ absorber catalyst) and a lean $NO_x$ trap (LNT) [i.e. an LNT on a separate substrate to the $NO_x$ absorber catalyst]. Such an arrangement may be called a PNA/LNT. The $NO_x$ absorber catalyst is typically followed by (e.g. is upstream of) the lean $NO_x$ trap (LNT). Thus, for example, an outlet of the $NO_x$ absorber catalyst is connected, preferably directly connected (e.g. without an intervening emissions control device), to an inlet of the lean $NO_x$ trap (LNT). There may be a hydrocarbon supply apparatus between the $NO_x$ absorber catalyst and the LNT.

A second exhaust system embodiment relates to an exhaust system comprising the $NO_x$ absorber catalyst of the invention (including any one of the first to fifth arrangements of the NO$_x$ absorber catalyst) and a selective catalytic reduction (SCR) catalyst. Such an arrangement may be called a PNA/SCR. The NO$_x$ absorber catalyst is typically followed by (e.g. is upstream of) the selective catalytic reduction (SCR) catalyst. Thus, for example, an outlet of the NO$_x$ absorber catalyst is connected, preferably directly connected (e.g. without an intervening emissions control device), to an inlet of the SCR catalyst.

A nitrogenous reductant injector may be arranged between the NO$_x$ absorber catalyst and the selective catalytic reduction (SCR) catalyst. Thus, the NO$_x$ absorber catalyst may be followed by (e.g. is upstream of) a nitrogenous reductant injector, and the nitrogenous reductant injector may be followed by (e.g. is upstream of) the selective catalytic reduction (SCR) catalyst.

In the second exhaust system embodiment, it may be preferable that the substrate (e.g. of the NO$_x$ absorber catalyst) is a filtering monolith. It is particularly preferable that the substrate (e.g. of the NO$_x$ absorber catalyst) is a filtering monolith when the NO$_x$ absorber catalyst comprises a DOC region.

A third exhaust system embodiment comprises the NO$_x$ absorber catalyst of the invention (including any one of the first to fifth arrangements of the NO$_x$ absorber catalyst) and a selective catalytic reduction filter (SCRF™) catalyst. Such an arrangement may be called a PNA/SCRF™. The NO$_x$ absorber catalyst is typically followed by (e.g. is upstream of) the selective catalytic reduction filter (SCRF™) catalyst. Thus, for example, an outlet of the NO$_x$ absorber catalyst is connected, preferably directly connected (e.g. without an intervening emissions control device), to an inlet of the selective catalytic reduction filter (SCRF™) catalyst.

A nitrogenous reductant injector may be arranged between the NO$_x$ absorber catalyst and the selective catalytic reduction filter (SCRF™) catalyst. Thus, the NO$_x$ absorber catalyst may be followed by (e.g. is upstream of) a nitrogenous reductant injector, and the nitrogenous reductant injector may be followed by (e.g. is upstream of) the selective catalytic reduction filter (SCRF™) catalyst.

A fourth exhaust system embodiment relates to an exhaust system comprising the NO$_x$ absorber catalyst of the invention (including any one of the first to fifth arrangements of the NO$_x$ absorber catalyst), a lean NO$_x$ trap (LNT) and either a selective catalytic reduction (SCR) catalyst or selective catalytic reduction filter (SCRF™) catalyst. These arrangements may be called a PNA/LNT/SCR arrangement or a PNA/LNT/SCRF™ arrangement. The NO$_x$ absorber catalyst is typically followed by (e.g. is upstream of) the lean NO$_x$ trap (LNT). The lean NO$_x$ trap (LNT) is typically followed by (e.g. is upstream of) either the selective catalytic reduction (SCR) catalyst or the selective catalytic reduction filter (SCRF™) catalyst. There may be a hydrocarbon supply apparatus between the NO$_x$ absorber catalyst and the LNT.

A nitrogenous reductant injector may be arranged between the lean NO$_x$ trap (LNT) and either the selective catalytic reduction (SCR) catalyst or the selective catalytic reduction filter (SCRF™) catalyst. Thus, the lean NO$_x$ trap (LNT) may be followed by (e.g. is upstream of) a nitrogenous reductant injector, and the nitrogenous reductant injector may be followed by (e.g. is upstream of) the selective catalytic reduction (SCR) catalyst or the selective catalytic reduction filter (SCRF™) catalyst.

A fifth exhaust system embodiment relates to an exhaust system comprising the NO$_x$ absorber catalyst of the invention (including any one of the first to fifth arrangements of the NO$_x$ absorber catalyst), a catalysed soot filter (CSF) and a selective catalytic reduction (SCR) catalyst. Such an arrangement may be called a PNA/CSF/SCR. The NO$_x$ absorber catalyst is typically followed by (e.g. is upstream of) the catalysed soot filter (CSF). The catalysed soot filter is typically followed by (e.g. is upstream of) the selective catalytic reduction (SCR) catalyst.

A nitrogenous reductant injector may be arranged between the catalysed soot filter (CSF) and the selective catalytic reduction (SCR) catalyst. Thus, the catalysed soot filter (CSF) may be followed by (e.g. is upstream of) a nitrogenous reductant injector, and the nitrogenous reductant injector may be followed by (e.g. is upstream of) the selective catalytic reduction (SCR) catalyst.

In each of the second to fifth exhaust system embodiments described hereinabove, an ASC catalyst can be disposed downstream from the SCR catalyst or the SCRF™ catalyst (i.e. as a separate substrate monolith), or more preferably a zone on a downstream or trailing end of the substrate monolith comprising the SCR catalyst can be used as a support for the ASC.

The exhaust system of the invention (including the first to the fifth exhaust system embodiments) may further comprise means for introducing hydrocarbon (e.g. fuel) into the exhaust gas. When the means for introducing hydrocarbon into the exhaust gas is a hydrocarbon supply apparatus, it is generally preferred that the hydrocarbon supply apparatus is downstream of the NO absorber catalyst of the invention (unless otherwise specified above).

It may be preferable that the exhaust system of the invention does not comprise a lean NO$_x$ trap (LNT), particularly a lean NO$_x$ trap (LNT) upstream of the NO$_x$ absorber catalyst, such as directly upstream of the NO$_x$ absorber catalyst (e.g. without an intervening emissions control device).

The PNA activity of the NO$_x$ absorber catalyst of the present invention allows NO$_x$, particularly NO, to be stored at low exhaust temperatures. At higher exhaust gas temperatures, the NO$_x$ absorber catalyst is able to oxidise NO to NO$_2$. It is therefore advantageous to combine the NO$_x$ absorber catalyst of the invention with certain types of emissions control devices as part of an exhaust system.

Another aspect of the invention relates to a vehicle or an apparatus. The vehicle or apparatus comprises a lean burn engine. Preferably, the lean burn engine is a diesel engine.

The diesel engine may be a homogeneous charge compression ignition (HCCI) engine, a pre-mixed charge compression ignition (PCCI) engine or a low temperature combustion (LTC) engine. It is preferred that the diesel engine is a conventional (i.e. traditional) diesel engine.

It is preferred that the lean burn engine is configured or adapted to run on fuel, preferably diesel fuel, comprises ≤50 ppm of sulfur, more preferably ≤15 ppm of sulfur, such as ≤10 ppm of sulfur, and even more preferably ≤5 ppm of sulfur.

The vehicle may be a light-duty diesel vehicle (LDV), such as defined in US or European legislation. A light-duty diesel vehicle typically has a weight of <2840 kg, more preferably a weight of <2610 kg.

In the US, a light-duty diesel vehicle (LDV) refers to a diesel vehicle having a gross weight of ≤8,500 pounds (US lbs). In Europe, the term light-duty diesel vehicle (LDV) refers to (i) passenger vehicles comprising no more than eight seats in addition to the driver's seat and having a maximum mass not exceeding 5 tonnes, and (ii) vehicles for the carriage of goods having a maximum mass not exceeding 12 tonnes.

Alternatively, the vehicle may be a heavy-duty diesel vehicle (HDV), such as a diesel vehicle having a gross weight of >8,500 pounds (US lbs), as defined in US legislation.

The invention also relates to a method of treating an exhaust gas from a lean burn engine. The method comprises the steps of:
(a) contacting the exhaust gas with a $NO_x$ absorber catalyst of the invention at a first temperature range to store $NO_x$; and
(b) releasing $NO_x$ from the $NO_x$ absorber catalyst at a second temperature range;
wherein the second temperature range is higher the first temperature range (e.g. the midpoint of the second temperature range is higher than the midpoint of the first temperature range).

It is preferable that the second temperature range does not overlap with the first temperature range. There may be a gap between the upper limit of first temperature range and the lower limit of the second temperature range.

Typically, the $NO_x$ absorber catalyst releases $NO_x$ at a temperature greater than 200° C. This is the lower limit of the second temperature range. Preferably, the $NO_x$ absorber catalyst releases $NO_x$ at a temperature of 220° C. or above, such as 230° C. or above, 240° C. or above, 250° C. or above, or 260° C. or above.

The $NO_x$ absorber catalyst typically absorbs or stores $NO_x$ at a temperature of 250° C. or less. This is the upper limit of the first temperature range. Preferably, the $NO_x$ absorber catalyst absorbs or stores $NO_x$ at a temperature of 220° C. or less, such as 200° C. or less, 190° C. or less, 180° C. or less, or 175° C. or less.

The $NO_x$ absorber catalyst may preferentially absorb or store nitric oxide (NO). Thus, any reference to absorbing, storing or releasing $NO_x$ in this context may refer absorbing, storing or releasing nitric oxide (NO). Preferential absorption or storage of NO will decrease the ratio of $NO:NO_2$ in the exhaust gas.

Definitions

The term "region" as used herein refers to an area of washcoat on a substrate. A "region" can, for example, be disposed or supported on a substrate as a "layer" or a "zone". The area or arrangement of a washcoat on a substrate is generally controlled during the process of applying the washcoat to the substrate. The "region" typically has distinct boundaries or edges (i.e. it is possible to distinguish one region from another region using conventional analytical techniques).

The term "washcoat" is well known in the art and refers to an adherent coating that is applied to a substrate usually during production of a catalyst.

Typically, the "region" has a substantially uniform length. The reference to a "substantially uniform length" in this context refers to a length that does not deviate (e.g. the difference between the maximum and minimum length) by more than 10%, preferably does not deviate by more than 5%, more preferably does not deviate by more than 1%, from its mean value.

It is preferable that each "region" has a substantially uniform composition (i.e. there is no substantial difference in the composition of the washcoat when comparing one part of the region with another part of that region). Substantially uniform composition in this context refers to a material (e.g. region) where the difference in composition when comparing one part of the region with another part of the region is 5% or less, usually 2.5% or less, and most commonly 1% or less.

The term "zone" as used herein refers to a region having a length that is less than the total length of the substrate, such as ≤75% of the total length of the substrate. A "zone" typically has a length (i.e. a substantially uniform length) of at least 5% (e.g. ≥5%) of the total length of the substrate.

The total length of a substrate is the distance between its inlet end and its outlet end (e.g. the opposing ends of the substrate).

Any reference to a "zone disposed at an inlet end of the substrate" used herein refers to a zone disposed or supported on a substrate where the zone is nearer to an inlet end of the substrate than the zone is to an outlet end of the substrate. Thus, the midpoint of the zone (i.e. at half its length) is nearer to the inlet end of the substrate than the midpoint is to the outlet end of the substrate. Similarly, any reference to a "zone disposed at an outlet end of the substrate" used herein refers to a zone disposed or supported on a substrate where the zone is nearer to an outlet end of the substrate than the zone is to an inlet end of the substrate. Thus, the midpoint of the zone (i.e. at half its length) is nearer to the outlet end of the substrate than the midpoint is to the inlet end of the substrate.

When the substrate is a wall-flow filter, then generally any reference to a "zone disposed at an inlet end of the substrate" refers to a zone disposed or supported on the substrate that is:
(a) nearer to an inlet end (e.g. open end) of an inlet channel of the substrate than the zone is to a closed end (e.g. blocked or plugged end) of the inlet channel, and/or
(b) nearer to a closed end (e.g. blocked or plugged end) of an outlet channel of the substrate than the zone is to an outlet end (e.g. open end) of the outlet channel.

Thus, the midpoint of the zone (i.e. at half its length) is (a) nearer to an inlet end of an inlet channel of the substrate than the midpoint is to the closed end of the inlet channel, and/or (b) nearer to a closed end of an outlet channel of the substrate than the midpoint is to an outlet end of the outlet channel.

Similarly, any reference to a "zone disposed at an outlet end of the substrate" when the substrate is a wall-flow filter refers to a zone disposed or supported on the substrate that is:
(a) nearer to an outlet end (e.g. an open end) of an outlet channel of the substrate than the zone is to a closed end (e.g. blocked or plugged) of the outlet channel, and/or
(b) nearer to a closed end (e.g. blocked or plugged end) of an inlet channel of the substrate than it is to an inlet end (e.g. an open end) of the inlet channel.

Thus, the midpoint of the zone (i.e. at half its length) is (a) nearer to an outlet end of an outlet channel of the substrate than the midpoint is to the closed end of the outlet channel, and/or (b) nearer to a closed end of an inlet channel of the substrate than the midpoint is to an inlet end of the inlet channel.

A zone may satisfy both (a) and (b) when the washcoat is present in the wall of the wall-flow filter (i.e. the zone is in-wall).

The acronym "PGM" as used herein refers to "platinum group metal". The term "platinum group metal" generally refers to a metal selected from the group consisting of Ru, Rh, Pd, Os, Ir and Pt, preferably a metal selected from the group consisting of Ru, Rh, Pd, Ir and Pt. In general, the term "PGM" preferably refers to a metal selected from the group consisting of Rh, Pt and Pd.

The term "adsorber" as used herein, particularly in the context of a $NO_x$ adsorber, should not be construed as being limited to the storage or trapping of a chemical entity (e.g. $NO_x$) only by means of adsorption. The term "adsorber" used herein is synonymous with "absorber".

The term "mixed oxide" as used herein generally refers to a mixture of oxides in a single phase, as is conventionally known in the art. The term "composite oxide" as used herein generally refers to a composition of oxides having more than one phase, as is conventionally known in the art.

The expression "consist essentially" as used herein limits the scope of a feature to include the specified materials, and any other materials or steps that do not materially affect the basic characteristics of that feature, such as for example minor impurities. The expression "consist essentially of" embraces the expression "consisting of".

The expression "substantially free of" as used herein with reference to a material, typically in the context of the content of a region, a layer or a zone, means that the material in a minor amount, such as 5% by weight, preferably 2% by weight, more preferably 1% by weight. The expression "substantially free of" embraces the expression "does not comprise".

Any reference to an amount of dopant, particularly a total amount, expressed as a % by weight as used herein refers to the weight of the support material or the refractory metal oxide thereof.

EXAMPLES

The invention will now be illustrated by the following non-limiting examples.

Example 1

Pd nitrate was added to a slurry of a small pore zeolite with CHA structure and was stirred. Alumina binder was added and then the slurry was applied to a cordierite flow through monolith having 400 cells per square inch using established coating techniques. The coating was dried and calcined at 500° C. A coating containing a Pd-exchanged zeolite was obtained. The Pd loading of this coating was 72 g ft$^{-3}$.

A second slurry was prepared using alumina powder milled to a $d_{90}$<20 micron. Appropriate amounts of soluble platinum and palladium salts were added followed by beta zeolite, such that the slurry comprised 72% silica-alumina and 28% zeolite by mass. The slurry was then stirred to homogenise. The resulting washcoat was applied to the channels at the inlet end of the flow through monolith using established coating techniques. The part was then dried. The Pt loading of this coating was 35 g ft$^{-3}$ and the Pd loading was 17.5 g ft$^{-3}$.

A third slurry was prepared using a Mn-doped silica-alumina powder milled to a $d_{90}$<20 micron. Soluble platinum salt was added and the mixture was stirred to homogenise. The slurry was applied to the channels at outlet end of the flow through monolith using established coating techniques. The coating was then dried and calcined at 500° C. The Pt loading of this coating was 17.5 g ft$^{-3}$.

Example 2

A slurry of cerium oxide and a small pore zeolite with the CHA structure was prepared. The composition of the slurry was 50% by weight cerium oxide and 50% by weight of the small pore zeolite. Pd nitrate was added to the slurry followed by alumina binder. The washcoat was stirred and applied to a cordierite flow through monolith having 400 cells per square inch using established coating techniques. The coating was dried and calcined at 500° C. A coating containing a Pd-exchanged zeolite was obtained. The Pd loading of this coating was 72 g ft$^{-3}$.

A second slurry was prepared using alumina powder milled to a $d_{90}$<20 micron. Appropriate amounts of soluble platinum and palladium salts were added to the slurry followed by beta zeolite, such that the slurry comprised 72% silica-alumina and 28% zeolite by mass. The slurry was then stirred to homogenise. The resulting washcoat was applied to the channels at the inlet end of the flow through monolith using established coating techniques. The part was then dried. The Pt loading of this coating was 35 g ft$^{-3}$ and the Pd loading was 17.5 g ft$^{-3}$.

A third slurry was prepared using a Mn-doped silica-alumina powder milled to a $d_{90}$<20 micron. Soluble platinum salt was added and the mixture was stirred to homogenise. The slurry was applied to the outlet end of the flow through monolith using established coating techniques. The coating was then dried and calcined at 500° C. The Pt loading of this coating was 17.5 g ft$^{-3}$.

EXPERIMENTAL RESULTS

The catalysts of examples 1 and 2 were hydrothermally aged at 800° C. for 16 hours with 10% water. They were performance tested over a simulated MVEG-B emissions cycle using a 2.0 litre bench mounted diesel engine. Emissions were measured pre- and post-catalyst. The $NO_x$ absorbing performance of each catalyst was determined as the difference between the cumulative $NO_x$ emission pre-catalyst compared with the cumulative $NO_x$ emission post-catalyst. The difference between the pre- and post-catalyst cumulative $NO_x$ emissions is attributed to $NO_x$ absorbed by the catalyst.

Table 1 below shows the $NO_x$ absorbing performance of the catalysts of examples 1 and 2 at 500 seconds into the MVEG-B test.

TABLE 1

| Example No. | $NO_x$ absorbed at 500 seconds (mg) |
|---|---|
| 1 | 253 |
| 2 | 323 |

The catalyst of example 2 shows a greater amount of $NO_x$ absorbed at 500 seconds into the MVEG-B test than the catalyst of example 1. The catalyst of example 2 comprises a first $NO_x$ absorber material and a second $NO_x$ absorber material. The catalyst of example 1 comprises a first $NO_x$ absorber but does not comprise ceria. The catalyst of example 2 has increased $NO_x$ absorbing ability.

For the avoidance of any doubt, the entire content of any and all documents cited herein is incorporated by reference into the present application.

The invention claimed is:

1. A $NO_x$ absorber catalyst for treating an exhaust gas from a diesel engine comprising:
    a first NOx absorber material comprising a molecular sieve catalyst, wherein the molecular sieve catalyst comprises palladium and a molecular sieve, and wherein the molecular sieve contains the palladium;
    a second NOx absorber material comprising palladium supported on an oxide of cerium; and a substrate having an inlet end and an outlet end;
wherein the NOx absorber catalyst comprises a region comprising a mixture of the first NOx absorber material and the second NOx absorber material; and
wherein the region is substantially free of a NOx storage component comprising an oxide, a carbonate or a hydroxide of an alkaline earth metal.

2. The $NO_x$ absorber catalyst according to claim 1, wherein the molecular sieve has an aluminosilicate framework, an aluminophosphate framework or a silico-aluminophosphate framework.

3. The $NO_x$ absorber catalyst according to claim 1, wherein the molecular sieve is selected from a small pore molecular sieve, a medium pore molecular sieve and a large pore molecular sieve.

4. The $NO_x$ absorber catalyst according to claim 1, wherein the molecular sieve has an aluminosilicate framework and a silica to alumina molar ratio of 10 to 200.

5. The $NO_x$ absorber catalyst according to claim 1, wherein the oxide of cerium is ceria ($CeO_2$) or a mixed or composite oxide of ceria and a second oxide selected from alumina and zirconia.

6. The $NO_x$ absorber catalyst according to claim 1, wherein the molecular sieve is a small pore molecular sieve having a Framework Type selected from the group consisting of ACO, AEI, AEN, AFN, AFT, AFX, ANA, APC, APD, ATT, CDO, CHA, DDR, DFT, EAB, EDI, EPI, ERI, GIS, GOO, IHW, ITE, ITW, LEV, KFI, MER, MON, NSI, OWE, PAU, PHI, RHO, RTH, SAT, SAV, SIV, THO, TSC, UEI, UFI, VNI, YUG, ZON and a mixture or intergrowth of any two or more thereof.

7. The $NO_x$ absorber catalyst according to claim 6, wherein the small pore molecular sieve has a Framework Type that is AEI or CHA.

* * * * *